UNITED STATES PATENT OFFICE

2,831,875

DERIVATIVES OF OXYGENATED STEROIDS

Eugene J. Agnello, Jackson Heights, N. Y., assignor to Chas. Pfizer & Co., New York, N. Y., a corporation of Delaware No Drawing. Application January 29, 1957
Serial No. 636,878

6 Claims. (Cl. 260—397.45)

This invention relates to the preparation of certain novel steroid compounds. In particular it is concerned with a series of hitherto unknown androstane and etiocholane derivatives, obtained from 7,14α,17α,21-tetrahydroxyprogesterone. This compound is described and claimed in the allowed patent application, Serial No. 415,972, now Patent No. 2,783,255, filed March 12, 1954, by Gilbert M. Shull et al.

The reactions involved in preparing the new compounds are shown in the following outline. It is obvious that, in lieu of the 17-OH substituents designated, ester substituents may be present. Particularly useful ester groups are those derived from hydrocarbon carboxylic acids containing up to about ten carbon atoms in the chain, for instance the formate, acetate, propionate, butyrate, benzoate, hemi-succinate and the like. It should also be pointed out that the wavy line at position C7 in compounds I, II and III is employed as the standard means of denoting either an alpha- or beta-position substitution. The wavy line at position C5 in compound III similarly denotes either a cis-hydrogen or a trans-hydrogen, in the one case an etiocholane derivative and in the other an androstane derivative.

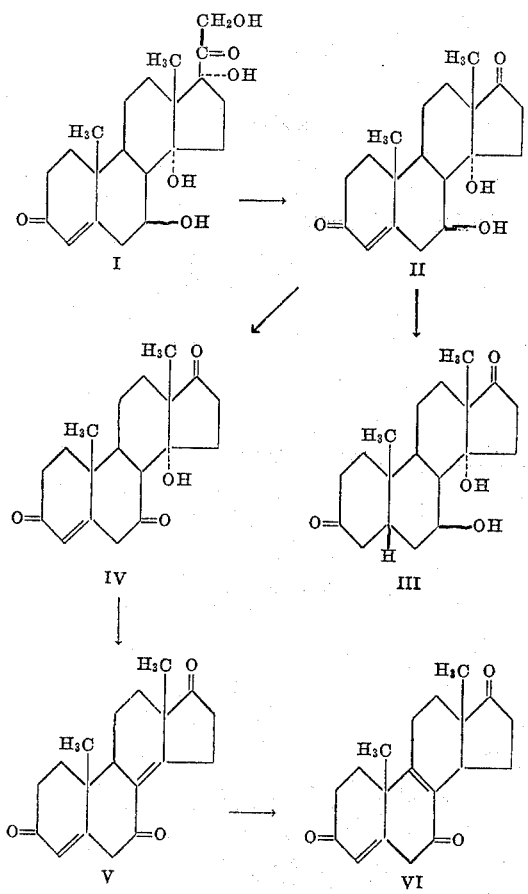

Another new compound according to this invention is prepared by alkaline dehydration of compound II, for instance, using 2% potassium hydroxide in alcohol. This compound is 14α-hydroxy-Δ$^{4,6}$-androstadiene-3,17-dione or

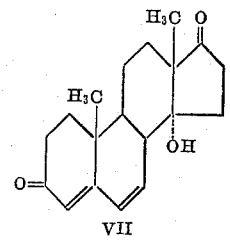

VII

When compound I is oxidized with sodium bismuthate, only the 17 side chain is affected, and compound II, Δ$^4$-androstene-7,14α-dihydroxy-3,17-dione, is produced. Oxidation of compound II with chromic acid, by the standard procedure with acetic acid at room temperature, gives compound IV, Δ$^4$-androstene-14α-ol-3,7,17-trione. If IV is then treated with para-toluene-sulfonic acid in refluxing benzene, for instance, compound V is formed, Δ$^{4,8(14)}$-androstadiene-3,7,17-trione. In admixture therewith is usually some of compound VI, Δ$^{4,8}$-androstadiene-3,7,17-trione; or alternatively V may be converted to VI by simple alkaline rearrangement.

When compound II is reacted directly with hydrogen in the presence of a palladium catalyst, for instance palladium on charcoal or on calcium carbonate, the nuclear double bond at the 4 position is hydrogenated, and there is produced a mixture of the cis- and trans-isomers of compound III, etiocholane-7,14α-diol-3,17-dione, and androstane-7,14α-diol-3,17-dione. These novel compounds can then be separated by standard column chromatography. In carrying out this reaction the steroid is dissolved in an inert solvent such as ethanol, methanol or isopropanol, and stirred in the presence of hydrogen, an atmospheric pressure of which is sufficient, although elevated pressures can also be used. The catalyst advantageously contains from 5 to 25% palladium on an inert carrier (such as calcium carbonate, zinc carbonate, carbon, barium carbonate, etc.) but these are not critical limits. A weight of catalyst from 5 to 100% of the weight of the steroid is preferably employed. Room temperature is the most convenient to use, since the reactions go well there, but warming may be effected to speed the reactions.

For the separation and purification of the isomers produced by the hydrogenation, both repeated fractional crystallization and column chromatography are useful, especially the latter. Florisil, silica gel, mixtures of diatomaceous earth and carbon, and other similar substances are satisfactory in the column, and various mixtures of solvents are used to elute the compounds, for example mixtures of methylene chloride and ethanol or mixtures of acetone and methanol.

The two ultimate nuclear-saturated products, illustrated by the structural Formula III, are particularly useful for their anabolic activity. In other words, they permit nitrogen-retention, an important change in the usual protein metabolism for patients involuntarily losing weight. This is accomplished without the undesirable androgenic side effects which are obtained, for instance, if testosterone or similar prior art anabolic hormones are employed. The new products are concomitantly pituitary depressants and anti-hypertensives. As is apparent from the above discussion of the process steps of the invention, the 4-unsaturated compound II finds an important utility as an intermediate for the synthesis of the pharmacologically active compounds III and VII. It and compounds IV, V and VI are also active in and of themselves.

The following examples are given by way of illustration only and are not to be considered as the sole embodiments of this invention. It is to be understood that protection hereof is only limited by the specific wording of the appended claims.

*Example I*

7,14α,17α,21-tetrahydroxyprogesterone (2 parts by weight) was dissolved in 50% by volume aqueous acetic acid, and the solution was shaken 45 minutes with 200 parts by weight of sodium bismuthate. The mixture was then diluted with about 0.1 its volume of water and treated with sufficient 3 N potassium hydroxide to neutralize 80% of the acetic acid. It was then shaken with about ⅓ its volume of benzene and filtered. The benzene layer was separated from the filtrate and the aqueous layer extracted three times with benzene, using about ⅓ volume of benzene each time. The benzene extracts were combined and washed three times with small volumes of water. Upon evaporation of the extract to dryness, Δ⁴-androstene-7,14α-dihydroxy-3,17-dione was recovered. The product exhibited M. P. 260–262° with dec., $[\alpha]_D^{25°} + 154°$ (dioxane), $$\lambda_{max}^{alc} \ 242 \ m\mu$$

($\epsilon = 15,300$).

*Analysis.*—Calcd. for $C_{19}H_{26}O_4$: C, 71.7; H, 8.23. Found: C, 71.8; H, 8.30. Infra-red absorption $$\lambda_{max}^{KBr} \ 3.05\mu, \ 5.76\mu, \ 6.10\mu, \ 6.23\mu$$

*Example II*

The product of Example I (0.5 gram) was treated with 100 ml. of 2% potassium hydroxide in methanol at room temperature for 2 hours, neutralized with glacial acetic acid and concentrated to dryness. A chloroform solution of the residue was washed with water and concentrated to dryness. The pale yellow solid was purified by chromatography on Florisil—starting with the crude product in benzene and eluting with 5:1 benzene-ether and 1:1 benzene-ether. The product eluted by 1:1 benzene-ether had M. P. 210–212° C. (dec.), $$[\alpha]_D^{CHCl_3} + 145.7°, \ \epsilon_{283}^{EtOH} \ 27,000$$

Recrystallization from methanol-ethyl acetate gave clusters of irregular prisms, M. P. 230–231°, $$[\alpha]_D^{CHCl_3} + 124.0, \ \epsilon_{283}^{EtOH} \ 24,000$$

*Analysis.*—Calcd. for $C_{19}H_{24}O_3$: C, 75.97; H, 8.05. Found: C, 76.17; H, 8.03.

This product was identified as compound VII, 14α-hydroxy-Δ⁴,⁶-androstadiene-3,17-dione.

*Example III*

Δ⁴-androstene-7,14α-diol-3,17-dione (compound II) was oxidized at room temperature with chromic acid in acetic acid. This resulted in the formation of Δ⁴-androstene-14α-ol-3,7,17-trione. The product was isolated by dilution of the reaction mixture from which it separated in solid form. The product displayed typical absorption bands in the infrared of a cyclic carbonyl compound possessing a 17-keto and a Δ⁴-3-keto group.

*Example IV*

One gram of Δ⁴-androstene-14α-ol-3,7,17-trione (compound IV) was treated in 100 milliliters of benzene with 100 milligrams of p-toluenesulfonic acid. The mixture was refluxed for four hours and the solution was then cooled. The cooled solution was washed with dilute sodium bicarbonate solution and with water. It was then evaporated to dryness, yielding a mixture of Δ⁴,⁸⁽¹⁴⁾-androstadiene-3,7,17-trione (compound V) and Δ⁴,⁸-androstadiene-3,7,17-trione (compound VI). This mixture was separated into the individual components by chromatography on a column containing a mixture of carbon and diatomaceous earth. The desired materials were eluted from the column with a mixture of acetone and methanol using increasing proportions of methanol and finally pure methanol.

*Example V*

Compound V, prepared as described above, used either alone or admixed with compound VI, was treated with a solution of potassium hydroxide in methanol. The mixture was maintained at room temperature for several hours under an atmosphere of nitrogen. The product, compound VI, was recovered by neutralizing the potassium hydroxide, concentrating the mixture and extracting the product from the residual salt with chloroform. Concentration of the chloroform solution gave the purified compound VI, that is, Δ⁴,⁸-androstadiene-3,7,17-trione. The product was also made by the same procedure but using a solution of hydrogen chloride in ethanol as the reagent.

*Example VI*

A solution of 500 milligrams of compound II in 100 milliliters of ethanol was hydrogenated at 20 p. s. i. hydrogen pressure using 400 milligrams of palladium-on-barium carbonate catalyst (5%). After three hours the hydrogenation was stopped and the catalyst was filtered. The product consisted of a mixture of the cis and trans isomers of compound III, that is, etiocholane-7,14α-diol-3,17-dione and androstane-7,14α-diol-3,17-dione. These were separated by chromatography on a column of diatomaceous earth using a mixture of acetone and methanol for elution. The initial solvent contained about 5% methanol and was gradually increased to pure methanol. The separated products were recovered in solid form by evaporation of the fractions obtained from the column.

What is claimed is:

1. Derivatives of androstane selected from the group consisting of those having the formula

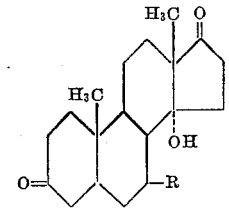

those having the formula

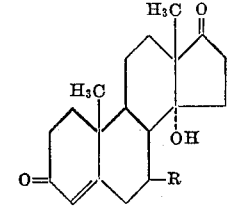

and those having the formulae

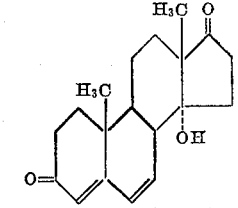

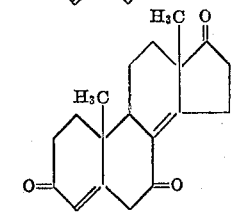

and

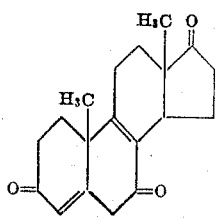

wherein R is selected from the group consisting of keto, alpha-hydroxy, beta-hydroxy and hydrocarbon acyloxy substituents containing up to about ten carbon atoms in the hydrocarbon chain.

2. 7,14α-dihydroxyandrostane-3,17-dione.
3. 7,14α-dihydroxyetiocholane-3,17-dione.
4. 7,14α-dihydroxy-$\Delta^4$-androstene-3,17-dione.
5. 14α-hydroxy-$\Delta^{4,6}$-androstadiene-3,17-dione.
6. 14α-hydroxy-$\Delta^4$-androstene-3,7,17-trione.

No references cited.